United States Patent
Kang

(10) Patent No.: US 9,030,401 B2
(45) Date of Patent: *May 12, 2015

(54) THREE-DIMENSIONAL DISPLAY DEVICE AND DISPLAY CONTROL METHOD THEREOF

(75) Inventor: Chih-tsung Kang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 177 days.

This patent is subject to a terminal disclaimer.

(21) Appl. No.: 13/513,305

(22) PCT Filed: Apr. 26, 2012

(86) PCT No.: PCT/CN2012/074727
§ 371 (c)(1),
(2), (4) Date: Jun. 1, 2012

(87) PCT Pub. No.: WO2013/155732
PCT Pub. Date: Oct. 24, 2013

(65) Prior Publication Data
US 2013/0278595 A1    Oct. 24, 2013

(30) Foreign Application Priority Data

Apr. 19, 2012 (CN) .......................... 2012 1 0117390

(51) Int. Cl.
*G06T 15/00* (2011.01)
*G09G 3/36* (2006.01)
*G09G 3/00* (2006.01)
*H04N 13/04* (2006.01)
*G09G 3/34* (2006.01)

(52) U.S. Cl.
CPC ............... *G09G 3/003* (2013.01); *G09G 3/342* (2013.01); *G09G 3/3611* (2013.01); *G09G 2320/0626* (2013.01); *H04N 13/0438* (2013.01); *H04N 13/0497* (2013.01)

(58) Field of Classification Search
CPC .. G02B 27/225; G02B 27/2264; G02B 27/22; G02B 27/2228; G06F 3/04815; H04N 13/00; H04N 13/0404; H04N 13/0048; H04N 13/0402; H04N 13/0497; G09G 3/003; G09G 3/342; G09G 3/3611; G09G 2320/0626
USPC .............. 345/6, 7, 89, 102, 419, 690; 348/51, 348/E13.029, E13.059; 349/15
See application file for complete search history.

(56) References Cited

U.S. PATENT DOCUMENTS 7,256,763 B2 * 8/2007 Kaneki et al. .................. 345/102
2002/0057238 A1 * 5/2002 Nitta et al. ....................... 345/87

(Continued)

*Primary Examiner* — Lun-Yi Lao
*Assistant Examiner* — Elliott Deaderick
(74) *Attorney, Agent, or Firm* — Andrew C. Cheng

(57) ABSTRACT

The present invention provides a three-dimensional display device and display control method thereof, wherein controlling a plurality of backlight units to activate simultaneously when a lowermost display area receiving drive signal of an image frame and when the liquid crystal in the lowermost display area completely responded, and each of backlight units being closed when corresponding display area starting to receive another image frame; wherein drive current of the backlight unit corresponding to each display area being used to control the luminance of each display area. With this, the present invention can reduce the crosstalk caused by the three-dimensional display device, resulting in the reduction of residual image and improving the three-dimensional display effect and viewing experience.

4 Claims, 4 Drawing Sheets

(56) References Cited

U.S. PATENT DOCUMENTS

| | | |
|---|---|---|
| 2002/0057241 A1* | 5/2002 | Oda et al. .................... 345/87 |
| 2010/0033462 A1* | 2/2010 | Hasegawa et al. ............ 345/211 |
| 2011/0007140 A1* | 1/2011 | Nakahata et al. ............. 348/56 |
| 2011/0013888 A1* | 1/2011 | Sasaki et al. ................. 386/353 |
| 2011/0157332 A1* | 6/2011 | Kim et al. .................... 348/56 |
| 2011/0193897 A1* | 8/2011 | Park et al. .................... 345/691 |
| 2011/0261034 A1* | 10/2011 | Tsuchida et al. .............. 345/204 |
| 2011/0292040 A1* | 12/2011 | Chiba ........................... 345/419 |
| 2012/0001956 A1* | 1/2012 | Sato ............................. 345/690 |

* cited by examiner

THREE-DIMENSIONAL DISPLAY DEVICE AND DISPLAY CONTROL METHOD THEREOF

BACKGROUND OF THE INVENTION

1. Field of the Invention

The present invention relates to the field of displaying techniques, and in particular to a three-dimensional (3D) display device and display control method thereof.

2. The Related Arts

Recently, the three-dimensional display techniques develop rapidly, and are widely applied to medical, advertising, military, exhibition, game, and so on. Referring to FIG. 1, FIG. 1 is a schematic view illustrating a known three-dimensional display device. As shown in FIG. 1, a three-dimensional display device comprises a liquid crystal display 10 and a pair of shutter glasses 13. Liquid crystal display mainly comprises liquid crystal display panel 11 and backlight module 12. Liquid crystal display panel 11 can display left-eye image and right-eye image alternatingly with the light supplied by backlight module 12.

Shutter glasses 13 comprise a left-eye lens 131 and a right-eye lens 132. Both left-eye lens 131 and right-eye lens 132 comprise two polarized lenses (not shown) and a liquid crystal layer (not shown) sandwiched between the two polarized lenses, respectively. Through supplying voltage to the corresponding liquid crystal layer, the opening and closing of left-eye lens 131 and right-eye lens 132 can be controlled. During the three-dimensional display process, when liquid crystal display panel 11 displays a left-eye image, left-eye lens 131 is open and right-eye lens 132 is closed. At this point, the left-eye image is transmitted to the viewer's left eye and the right eye sees a black image. When liquid crystal display panel 11 displays a right-eye image, left-eye lens 131 is closed and right-eye lens 132 is open. At this point, the right-eye image is transmitted to the viewer's right eye and the left eye sees a black image. In other words, the left eye and the right eye of the viewer alternatingly receive the left-eye image and right-eye image, which are then composited to form three-dimensional image in the viewer's brain to obtain the three-dimensional effect.

Referring to FIG. 2, FIG. 2 is a timing sequence diagram of the three-dimensional display device of FIG. 1. As shown in FIG. 2, the y-axis of the timing sequence diagram shows the vertical position of liquid crystal display panel 11, and the x-axis shows the time. Because, in the known techniques, backlight module 12 is divided into a plurality of level areas vertically, the scanning by backlight module 12 is conducted to control the opening and activation duration of each of the level area sequentially in the top-down manner. Specifically, as shown in FIG. 2, backlight module 12 include five level areas, i.e., area S1, area S2, area S3, area S4 and area S5. Liquid crystal display panel 11 displays left-eye image and right-eye image alternatingly, wherein the time of left-eye image is T1 and the time of right-eye image is T2, T1 and T2 represents the time of an image frame. When driving, the drive signals are supplied to liquid crystal display panel 11 corresponding to each level area sequentially in a top-down manner, and liquid crystal starts to respond after liquid crystal pixel receiving drive voltage to charge. Therefore, because of the pixel design and the viscosity of liquid crystal, a period L0 is required before reaching stability. With drive signal of all areas S1, S2, S3, S4 and S5, because left-eye lens 131 is activated and closed at a later time and the drive signal of area S1 has changed from the left-eye image frame to the right-eye image frame of the next signal, and because of the delayed response time L0 of liquid crystal pixel, the left-eye image frame and the right-eye image frame will exist in area S1 simultaneously, resulting in residual image in area S1. Besides, left-eye lens 131 is open at an earlier time and drive signals are supplied to area S1, S2, S3, S4, S5 at the same time, and because of the delayed response time L0 of liquid crystal pixel, areas S1, S2, S3, S4 and S5 will be affected by the previous right-eye image frame, resulting in image residual.

Accordingly, in the known three-dimensional display techniques, the image residual is caused by crosstalk between left eye and right eye to affect the three-dimensional display effect.

Thus, it is desired to have a three-dimensional display device and display control method thereof to solve the above problems.

SUMMARY OF THE INVENTION

The technical issue to be addressed by the present invention is to provide a three-dimensional display device and display control method thereof, to reduce the residual image problem in three-dimensional display device caused by crosstalk to improve the three-dimensional display effect.

The present invention provides a three-dimensional display device, which comprises: a liquid crystal display panel, the liquid crystal display panel displaying left-eye image frame and right-eye image frame alternatingly, the liquid crystal display panel being divided into a plurality of display areas distributed continuously and sequentially, and driving being conducted in top-down scanning manner sequentially to drive the plurality of display areas; a plurality of backlight units, each of backlight units corresponding to each of display areas, the plurality of backlight units activating simultaneously when the lowermost display area receiving drive signal of an image frame and when the liquid crystal in the lowermost display area completely responded, and each of backlight units being closed when corresponding display area starting to receive another image frame.

According to the present embodiment, the drive current of the backlight unit corresponding to each display area is used to control the luminance of each display area. The plurality of display areas are the first display area to Nth display area distributed on the liquid crystal panel from top-down continuously and sequentially. The plurality of backlight units are the first to Nth backlight units corresponding to N display areas respectively. The luminance of N display areas are $B_1$, $B_2$, ..., $B_n$, respectively. The activation durations of the N backlight units are not the same, and are $T_1$, $T_2$, ..., $T_n$, respectively, where N is an integer equal to or greater than 2. The luminance of each of the N display areas and the activation duration of each of the N backlight units satisfy the following equation:

$$B_1 * T_1 = B_2 * T_2 = \ldots = B_n * T_n$$

The present invention provides a three-dimensional display device, which comprises: a liquid crystal display panel, the liquid crystal display panel displaying left-eye image frame and right-eye image frame alternatingly, the liquid crystal display panel being divided into a plurality of display areas distributed continuously and sequentially, and driving being conducted in top-down scanning manner sequentially to drive plurality of display areas; a plurality of backlight units, each of backlight units corresponding to each of display areas, the plurality of backlight units activating simultaneously when the lowermost display area receiving drive signal of an image frame and when the liquid crystal in the lowermost display area completely responded, and each of backlight units being closed when corresponding display area starting to receive another image frame.

According to the present embodiment, the drive current of the backlight unit corresponding to each display area is used to control the luminance of each display area.

According to the present embodiment, the plurality of display areas are the first display area to Nth display area distributed on the liquid crystal panel from top-down continuously and sequentially. The plurality of backlight units are the first to Nth backlight units corresponding to N display areas respectively. The luminance of N display areas are $B_1$, $B_2$, ..., $B_n$, respectively. The activation durations of the N backlight units are not the same, and are $T_1$, $T_2$, ..., $T_n$, respectively, where N is an integer equal to or greater than 2. The luminance of each of the N display areas and the activation duration of each of the N backlight units satisfy the following equation:

$$B_1 * T_1 = B_2 * T_2 = \ldots = B_n * T_n, \text{ wherein } T_1 < T_2 < \ldots < T_n$$

According to the present embodiment, the drive current of each of N backlight units is $I_1$, $I_2$, ..., $I_n$, respectively, and $I_1 > I_2 > \ldots > I_n$.

According to the present embodiment, the penetration ratio of the current maximum signal of each of display area is $T_{s1}$, $T_{s2}$, ..., $T_{sn}$, respectively; after compensating the penetration ratio of the current maximum signal of each of display area to $T_{s255}$ in the N display areas, where $T_{s255}$ is the penetration ratio of grey-scale 255, the luminance of each of N display areas is $B_{11}$, $B_{21}$, ..., $B_{n1}$, respectively; and the luminance of each of N display areas after adjustment satisfies the following equation:

$$T_1 * B_1 * T_{s1} = T_1 * B_{11} * T_{s255}, T_2 * B_2 * T_{s2} = T_2 * B_{21} * T_{s255}, \ldots, T_n * B_n * T_{sn} = T_n * B_{n1} * T_{s255}, \text{ wherein } T_{s1} < T_{s255}, T_{s2} < T_{s255}, \ldots, T_{sn} \leq T_{s255}$$

According to the present embodiment, after adjusting N display areas, the drive current of each of N display areas is $I_{11}, I_{21}, \ldots, I_{n1}$, respectively, and $I_{11} < I_1, I_{21} < I_2, \ldots, I_{n1} < I_n$.

The present invention provides a display control method of three-dimensional display device, which comprises: controlling the liquid crystal display panel to display left-eye image frame and right-eye image frame alternatingly, the liquid crystal display panel being divided into a plurality of display areas distributed continuously and sequentially, and driving being conducted in top-down scanning manner sequentially to drive plurality of display areas; disposing a plurality of backlight units, each of backlight units corresponding to each of display areas, controlling the plurality of backlight units to activate simultaneously when the lowermost display area receiving drive signal of an image frame and when the liquid crystal in the lowermost display area completely responded, and each of backlight units being closed when corresponding display area starting to receive another image frame.

According to the present embodiment, the drive current of the backlight unit corresponding to each display area is used to control the luminance of each display area.

According to the present embodiment, the plurality of display areas are the first display area to Nth display area distributed on the liquid crystal panel from top-down continuously and sequentially. The plurality of backlight units are the first to Nth backlight units corresponding to N display areas respectively. The luminance of N display areas are $B_1$, $B_2$, ..., $B_n$, respectively. The activation durations of the N backlight units are not the same, and are $T_1$, $T_2$, ..., $T_n$, respectively, where N is an integer equal to or greater than 2. The luminance of each of the N display areas and the activation duration of each of the N backlight units satisfy the following equation: $B_1 * T_1 = B_2 * T_2 = \ldots = B_n * T_n$, wherein $T_1 < T_2 < \ldots < T_n$.

According to the present embodiment, the drive current of each of N backlight units is $I_1$, $I_2$, ..., $I_n$, respectively, and $I_1 > I_2 > \ldots > I_n$.

According to the present embodiment, the penetration ratio of the current maximum signal of each of display area is $T_{s1}$, $T_{s2}$, ..., $T_{sn}$, respectively; after compensating the penetration ratio of the current maximum signal of each of display area to $T_{s255}$ in the N display areas, where $T_{s255}$ is the penetration ratio of grey-scale 255, the luminance of each of N display areas is $B_{11}, B_{21}, \ldots, B_{n1}$, respectively; and the luminance of each of N display areas after adjustment satisfies the following equation:

$$T_1 * B_1 * T_{s1} = T_1 * B_{11} * T_{s255}, T_2 * B_2 * T_{s2} = T_2 * B_{21} * T_{s255}, \ldots, T_n * B_n * T_{sn} = T_n * B_{n1} * T_{s255}, \text{ wherein } T_{s1} < T_{s255}, T_{s2} < T_{s255}, \ldots, T_{sn} < T_{s255}$$

According to the present embodiment, after adjusting N display areas, the drive current of each of N display areas is $I_{11}, I_{21}, \ldots, I_{n1}$, respectively, and $I_{11} < I_1, I_{21} < I_2, \ldots, I_{n1} < I_n$.

The efficacy of the present invention is that to be distinguished from the state of the art. The three-dimensional display device and the display control method thereof according to the present invention is to drive a plurality of display areas in top-down scanning manner sequentially from the liquid crystal display panel, and to control a plurality of backlight units to receive drive signal for an image frame in the lowermost display area and to activate simultaneously when the liquid crystal in the lowermost display area completely responded, and each of backlight units being closed when corresponding display area starting to receive another image frame. Each of the backlight units is activated only when the liquid crystal has completely responded to reduce the crosstalk caused by the three-dimensional display device, resulting in the reduction of residual image and improving the three-dimensional display effect and viewing experience. In addition, through controlling the drive currents of a plurality of backlight units, the luminance uniformity of the liquid crystal panel is improved.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
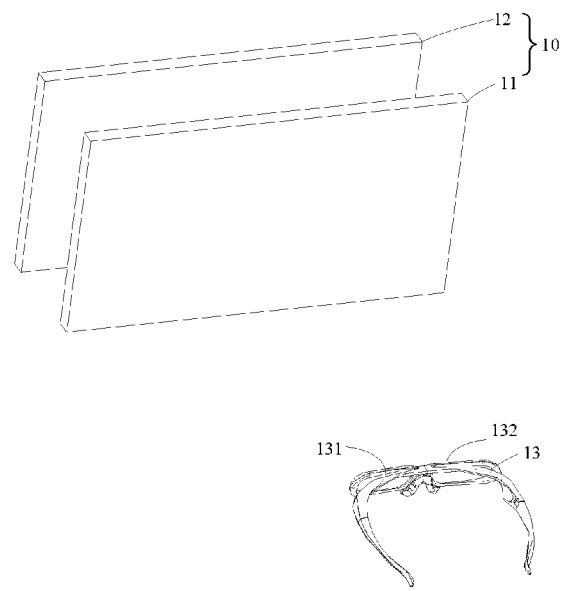
FIG. 1 is a schematic view showing the structure of a known three-dimensional display device.
Figure 2:
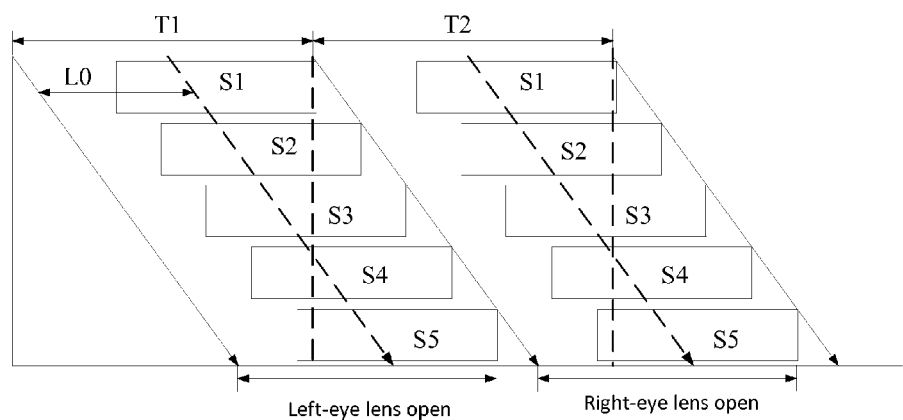
FIG. 2 is a timing sequence diagram of the three-dimensional display device of FIG. 1.
Figure 3:
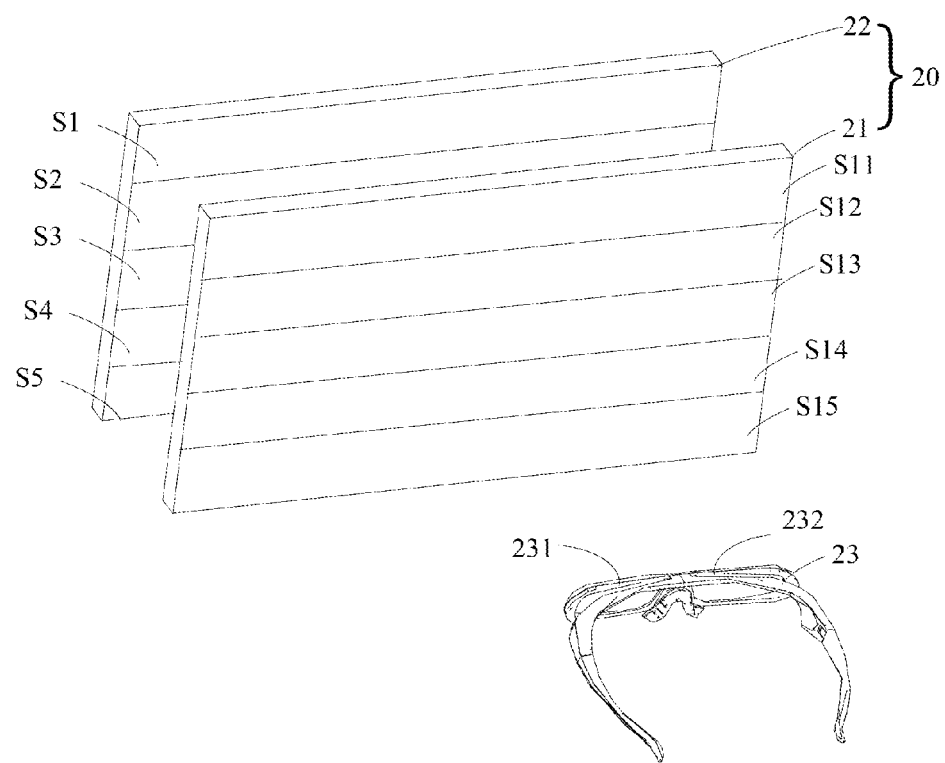
FIG. 3 is schematic view showing the first embodiment of the structure of a three-dimensional display device according to the present invention.
Figure 4:
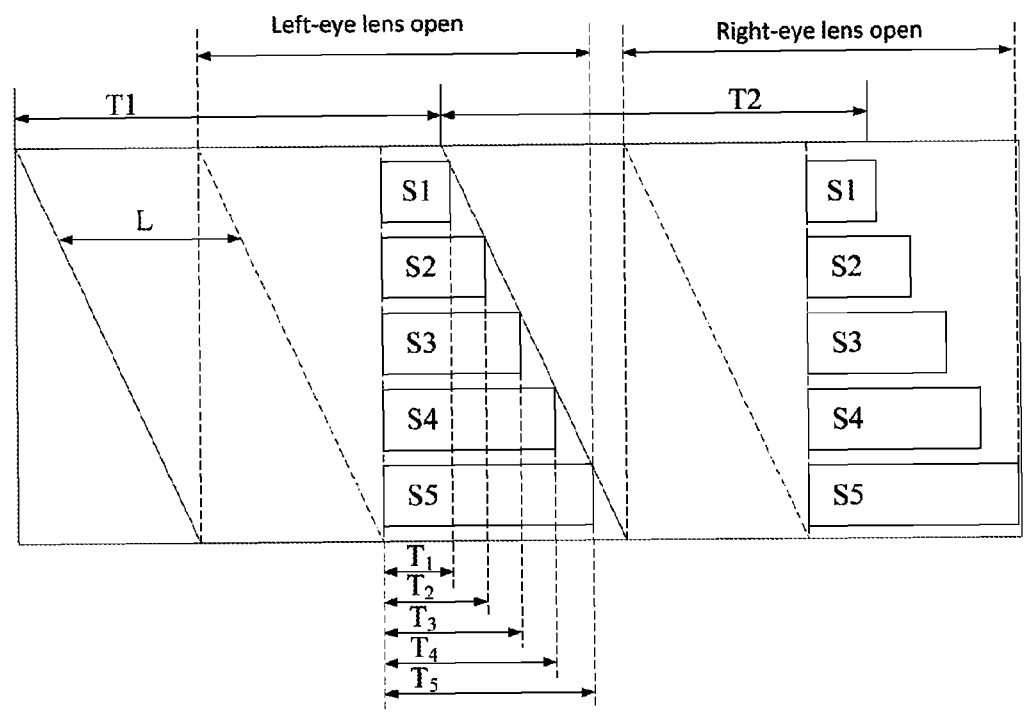
FIG. 4 is a timing sequence diagram of the three-dimensional display device of FIG. 3.

Referring to FIG. 3 and FIG. 4, FIG. 3 is a schematic view showing the first embodiment of the structure of a three-dimensional display device according to the present invention; and FIG. 4 is a timing sequence diagram of the three-dimensional display device of FIG. 3. As shown in FIG. 3, the three-dimensional display device of the present embodiment comprises a liquid crystal display 20 and shutter glasses 23, wherein liquid crystal display 20 further comprises a liquid crystal display panel 21 and a backlight module 22. Liquid crystal display panel 21 is disposed between backlight module 22 and shutter glasses 23 and laminated by light supplied by backlight module 22.

Liquid crystal display panel 21 is for displaying left-eye image frame and right-eye image frame alternatingly, wherein liquid crystal display panel 21 is divided into a plurality of display areas distributed continuously and sequentially. In the instance of the present embodiment, liquid crystal display panel 21 is divided into five display areas, comprising: display areas S11, S12, S13, S14 and S15, wherein display area S11 is the uppermost display area on liquid crystal display panel 21, and display area S15 is the lowermost display area on liquid crystal display panel 21.

According to the instance of the present embodiment, liquid crystal display panel 21 is scanned in the top-down manner to drive display areas S11, S12, S13, S14, and S15, sequentially. In other words, display area S11 is the first to be driven, followed by displays S12, S13, S14 and finally display area S15 is the last to be driven.

Backlight module 22 comprises a plurality of backlight units, each of backlight units corresponding to each of display areas. In the instance of the present embodiment, backlight module 22 comprises backlight units S1, S2, S3, S4 and S5, wherein backlight units S1, S2, S3, S4, S5 correspond to display areas S11, S12, S13, S14, S15, respectively. Backlight units S1, S2, S3, S4, S5 activate simultaneously when lowermost display area S15 receives drive signal of an image frame and when the liquid crystal in lowermost display area S15 is completely responded, and each of backlight units is closed when corresponding display area starting to receive another image frame. Hence, as shown in FIG. 4, in the instance of the present embodiment, backlight units S1, S2, S3, S4, S5 activate simultaneously, but have different activation durations, i.e., stay activated for a different duration, and $T_1 < T_2 < T_3 < T_4 < T_5$.

In the present invention, the drive current of the backlight unit corresponding to each display area is used to control the luminance of each display area. The luminance of each of display areas S11, S12, S13, S14 and S15 is $B_1$, $B_2$, $B_3$, $B_4$, and $B_5$, respectively. The drive current of each of backlight units $S_1$, $S_2$, $S_3$, $S_4$, and $S_5$ is $I_1$, $I_2$, $I_3$, $I_4$, and $I_5$, respectively. The luminance of each of display areas S11, S12, S13, S14 and S15 and the activation duration of each of backlight units $S_1$, $S_2$, $S_3$, $S_4$, and $S_5$ satisfy the following equation (1):

$$B_1 * T_1 = B_2 * T_2 = \ldots = B_n * T_n \quad (1)$$

In equation (1), because $T_1 < T_2 < T_3 < T_4 < T_5$, it is concluded that $B_1 > B_2 > B_3 > B_4 > B_5$. Therefore, The drive current of each of backlight units $S_1$, $S_2$, $S_3$, $S_4$, and $S_5$ satisfies the relation: $I_1 > I_2 > I_3 > I_4 > I_5$.

In the instant of the present embodiment, because the activation duration of each of backlight units $S_1$, $S_2$, $S_3$, $S_4$, and $S_5$ is different, the overall luminance uniformity of display areas S11, S12, S13, S14 and S15 is bad. Therefore, by dynamically adjusting the drive current of each of backlight units $S_1$, $S_2$, $S_3$, $S_4$, and $S_5$ to compensate the luminance of display areas S11, S12, S13, S14 and S15, the overall luminance of liquid crystal panel 21 can be maintained.

Shutter glasses 23 comprise a left-eye lens 231 and a right-eye lens 232, and can synchronize the liquid crystal panel 21 by IR signal, Bluetooth signal or other communication means. Left-eye lens 231 and right-eye lens 232 can open alternatingly according to the synchronization signals generated by liquid crystal panel 21 to emit left-eye image frame and right-eye image frame alternatingly.

As shown in FIG. 4, liquid crystal panel 21 of the present embodiment displays left-eye image frame and right-eye image frame alternatingly, wherein the time of left-eye image frame is $T_1$, and the time of right-eye image frame is $T_2$, $T_1$ and $T_2$ represent the time of an image frame.

During time $T_1$ of left-eye image frame, uppermost display area S11 is the first to be driven, followed by display areas S12, S13, S14 and finally lowermost display area S15. After display area S15 receives the drive signal of left-eye image frame and after the liquid crystal of display area S15 has completely responded, backlight units S1, S2, S3, S4 and S5 are activated simultaneously. Each of backlight units S1, S2, S3, S4 and S5 is closed when corresponding display starts to receive the drive signal of the right-eye image frame, wherein the response time of liquid crystal is L.

According to the present embodiment, left-eye lens 231 is activated when the liquid crystal of last scanned display area S15 of liquid crystal panel 21 starts to receive drive signal of left-eye image frame, and is closed when the liquid crystal of last scanned display area S15 of liquid crystal panel 21 starts to receive drive signal of right-eye image frame. Right-eye lens 232 is activated when the liquid crystal of last scanned display area S15 of liquid crystal panel 21 starts to receive drive signal of right-eye image frame, and is closed when the liquid crystal of last scanned display area S15 of liquid crystal panel 21 starts to receive drive signal of left-eye image frame.

Compared to the three-dimensional display device of knows techniques, the three-dimensional display device of the present invention drives display areas S11, S12, S13, S14, S15 in top-down scanning manner sequentially from liquid crystal display panel 21, and to control backlight units S1, S2, S3, S4, S5 to receive drive signal for an image frame in the lowermost display area S15 and to activate simultaneously when the liquid crystal in the lowermost display area S15 completely responded. Each of backlight units S1, S2, S3, S4, S5 is closed when corresponding display area starting to receive drive signal of another image frame to reduce the crosstalk caused by the three-dimensional display device, resulting in the reduction of residual image and improving the three-dimensional display effect and viewing experience. In addition, through controlling the drive currents of a plurality of backlight units, the luminance uniformity of the liquid crystal panel is improved. In addition, by dynamically controlling drive currents $I_1$, $I_2$, $I_3$, $I_4$, and $I_5$ of backlight units S1, S2, S3, S4, S5, the overall luminance uniformity of liquid crystal panel 21 can be improved.

On the basis of the aforementioned first embodiment, the present invention further provides a second embodiment of the three-dimensional display device. The difference between the first embodiment and the second embodiment is: the second embodiment performs compensation to the maximum signal of each of display areas to further reduce the drive current of the backlight units to save energy consumption.

Specifically, assume that the current maximum signal penetration ratio of each of the display areas S11, S12, S13, S14, S15 is $T_{s1}$, $T_{s2}$, $T_{s3}$, $T_{s4}$, $T_{s5}$, respectively. By compensation computation, the current maximum signal penetration ratio of each of the display areas S11, S12, S13, S14, S15 is adjusted to $T_{s255}$, wherein $T_{s255}$ is the penetration ratio of grey-scale 255. After adjusting the display areas S11, S12, S13, S14, S15, the luminance of each of the display areas S11, S12, S13, S14, S15 is $B_{11}$, $B_{21}$, $B_{31}$, $B_{41}$, $B_{51}$, respectively, and the adjusted luminance $B_{11}$, $B_{21}$, $B_{31}$, $B_{41}$, $B_{51}$ of each of the display areas S11, S12, S13, S14, S15 satisfies the following equation (2):

$$T_1*B_1*T_{s1}=T_1*B_{11}*T_{s255}$$

$$T_2*B_2*T_{s2}=T_2*B_{21}*T_{s255}$$

$$T_3*B_3*T_{s3}=T_3*B_{31}*T_{s255}$$

$$T_4*B_4*T_{s4}=T_4*B_{41}*T_{s255}$$

$$T_5*B_5*T_{s5}=T_5*B_{51}*T_{s255} \quad (2)$$

In equation (2), because $T_{s1}<T_{s255}$, $T_{s2}<T_{s255}$, $T_{s3}<T_{s255}$, $T_{s4}<T_{s255}$, $T_{s5}<T_{s255}$, it is concluded that $B_1>B_{11}$, $B_2>B_{21}$, $B_3>B_{31}$, $B_4>B_{41}$, $B_5>B_{51}$. Therefore, the drive current of each of the backlight units S1, S2, S3, S4, S5 is $I_{11}$, $I_{21}$, $I_{31}$, $I_{41}$, $I_{51}$, respectively, and $I_{11}<I_1$, $I_{21}<I_2$, $I_{31}<I_3$, $I_{41}<I_4$, $I_{51}<I_5$. In other words, the drive current after adjustment is smaller than the drive current before the adjustment, further reducing power consumption to save energy.

It is worth noting that the above compensation computation method can employ any known grey-scale compensation computation through adjusting the drive current of the display areas. In addition, in other embodiments, those skilled in the field can easily adjust the penetration ratio of the maximum signal of each display area to the penetration ratio of other grey scale.

Compared to the three-dimensional display device of the first embodiment, the three-dimensional display device of the second embodiment, by adjusting the penetration ratio of the maximum signal of display areas S11, S12, S13, S14, S15 to $T_{s255}$, does not need large drive current to reduce the crosstalk generated by three-dimensional display device, resulting in further reduction of residual image so as to achieve the display quality improvement with minimum power consumption.

It is worth noting that the above description is based on the instance of dividing liquid crystal display panel 21 and backlight module 22 into five areas. In another embodiment of the present invention, liquid crystal display panel 21 can be divided into N areas, where N is any integer greater than 2. Thus, the N display areas are the first display area to Nth display area distributed on liquid crystal panel 21 from top-down continuously and sequentially, and backlight module 22 comprises N backlight units, with each of N backlight units corresponding to each of N display areas respectively.

The luminance of N display areas are $B_1$, $B_2$, ..., $B_n$, respectively. The activation durations of the N backlight units are not the same, and are $T_1$, $T_2$, ..., $T_n$, respectively. The luminance of each of the N display areas and the activation duration of each of the N backlight units satisfy the following equation (3):

$$B_1*T_1=B_2*T_2=...=B_n*T_n \quad (3)$$

In equation (3), because $T_1<T_2<...<T_n$, it is concluded that $B_1>B_2>...>B_n$. Therefore, The drive current $I_1$, $I_2$, ..., $I_5$ of each of N backlight units satisfies the relation: $I_1>I_2>...>I_5$.

According to the instance of the present embodiment, the penetration ratio of the current maximum signal of each of display area is $T_{s1}$, $T_{s2}$, ..., $T_{sn}$, respectively; after compensating the penetration ratio of the current maximum signal of each of display area to $T_{s255}$ in the N display areas, where $T_{s255}$ is the penetration ratio of grey-scale 255, the luminance of each of N display areas is $B_{11}$, $B_{21}$, ..., $B_{n1}$, respectively; and the luminance of each of N display areas after adjustment satisfies the following equation (4):

$$T_1*B_1*T_{s1}=T_1*B_{11}*T_{s255}, T_2*B_2*T_{s2}=T_2*B_{21}*T_{s255}, ..., T_n*B_n*T_{sn}=T_n*B_{n1}*T_{s255}. \quad (4)$$

In equation (4), $T_{s1}<T_{s255}$, $T_{s2}<T_{s255}$, ..., $T_{sn}<T_{s255}$. Therefore, the drive current of each of N backlight units is $I_{11}$, $I_{21}$, ..., $I_{n1}$, respectively, and $I_{11}<I_1$, $I_{21}<I_2$, ..., $I_{n1}<I_n$.

Figure 5:
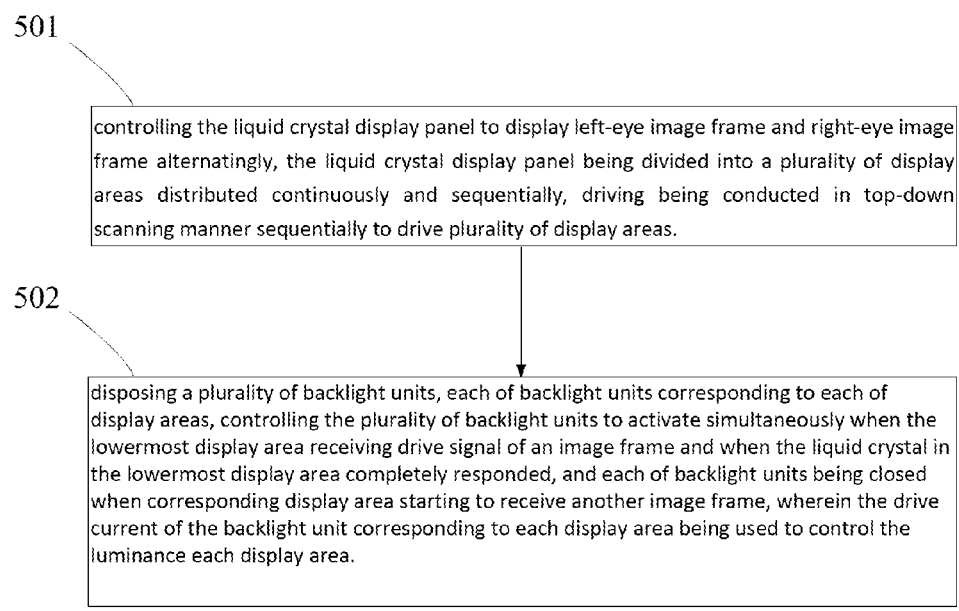
FIG. 5 is a flowchart of a display control method of the first embodiment of the three-dimensional display device according to the present invention.

Referring to FIG. 5, FIG. 5 is a flowchart of the display control method of the three-dimensional display device according to the first embodiment of the present invention. As shown in FIG. 5, the method comprises the steps of:

Step S501: controlling the liquid crystal display panel to display left-eye image frame and right-eye image frame alternatingly, the liquid crystal display panel being divided into a plurality of display areas distributed continuously and sequentially, driving being conducted in top-down scanning manner sequentially to drive plurality of display areas.

Step S502: disposing a plurality of backlight units, each of the backlight units corresponding to each of the display areas, controlling the plurality of backlight units to activate simultaneously when the lowermost display area receives the drive signal of an image frame and when the liquid crystal in the lowermost display area completely responds, and each of the backlight units being closed when the corresponding display area starts to receive another image frame, wherein the drive current of the backlight unit corresponding to each display area is used to control the luminance of each display area.

The details of the above steps can refer to the above detailed description, and is thus omitted here.

In summary, the three-dimensional display device and the display control method thereof according to the present invention is to drive a plurality of display areas in top-down scanning manner sequentially from the liquid crystal display panel, and to control a plurality of backlight units to receive drive signal for an image frame in the lowermost display area and to activate simultaneously when the liquid crystal in the lowermost display area completely responded, and each of backlight units being closed when corresponding display area starting to receive another image frame. Each of the backlight units is activated only when the liquid crystal has completely responded to reduce the crosstalk caused by the three-dimensional display device, resulting in the reduction of residual image and improving the three-dimensional display effect and viewing experience. In addition, through controlling the drive currents of a plurality of backlight units, the luminance uniformity of the liquid crystal panel is improved.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A three-dimensional display device, which comprises:
   a liquid crystal display panel, the liquid crystal display panel displaying left-eye image frames and right-eye image frames alternatingly, the liquid crystal display panel being divided into a plurality of display areas distributed continuously and sequentially, and driving being conducted in top-down scanning manner sequentially to drive the plurality of display areas;
   a plurality of backlight units, each of the backlight units corresponding to each of the display areas, the plurality of backlight units activating simultaneously wherein activation durations of the backlight units simultaneously start when a lowermost display area receives a drive signal of an image frame and when a liquid crystal in the lowermost display area completely responds, and each of the backlight units being closed when the corresponding display area starts to receive another image frame;

wherein the drive current of the backlight unit corresponding to each display area is used to control luminance of each display area;

wherein the plurality of display areas are a first display area to Nth display area distributed on the liquid crystal display panel from top-down continuously and sequentially; the plurality of backlight units are a first to Nth backlight units corresponding to the N display areas respectively; the luminance of the N display areas are $B_1, B_2, \ldots, B_n$, respectively; the activation durations of the N backlight units are not the same, and are $T_1, T_2, \ldots, T_n$, respectively, where N is an integer equal to or greater than 2; the luminance of each of the N display areas and the activation duration of each of the N backlight units satisfy the following equation:

$$B_1*T_1=B_2*T_2=\ldots=B_n*T_n, \text{ wherein } T_1<T_2<\ldots<T_n;$$

wherein the drive current of each of N backlight units is $I_1, I_2, \ldots, I_n$, respectively, and $I_1>I_2>\ldots, I_n$;

wherein a penetration ratio of current maximum signal of each of display area is $T_{s1}, T_{s2}, \ldots, T_{sn}$, respectively; after compensating the penetration ratio of the current maximum signal of each of display area to $T_{s255}$ in the N display areas, where $T_{s255}$ is a penetration ratio of greyscale 255, the luminance of each of N display areas is $B_{11}, B_{21}, \ldots, B_{n1}$, respectively; and the luminance of each of N display areas after adjustment satisfies the following equation:

$$T_1*B_1*T_{s1}=T_1*B_{11}*T_{s255}, T_2*B_2*T_{s2}=T_2*B_{21}*T_{s255}, \ldots, T_n*B_n*T_{sn}=T_n*B_{n1}*T_{s255}, \text{ wherein } T_{s1}<T_{s255}, T_{s2}<T_{s255}, \ldots, T_{sn} \leq T_{s255}.$$

2. The three-dimensional display device as claimed in claim 1, wherein after adjusting the N display areas, the drive current of each of the N display areas is $I_{11}, I_{21}, \ldots, I_{n1}$, respectively, and $I_{11}<I_1, I_{21}<I_2, \ldots, I_{n1}<I_n$.

3. A display control method of a three-dimensional display device, which comprises:

controlling a liquid crystal display panel to display left-eye image frames and right-eye image frames alternatingly, the liquid crystal display panel being divided into a plurality of display areas distributed continuously and sequentially, and driving being conducted in top-down scanning manner sequentially to drive the plurality of display areas;

disposing a plurality of backlight units, each of the backlight units corresponding to each of the display areas, controlling the plurality of backlight units to activate simultaneously wherein activation durations of the backlight units simultaneously start when a lowermost display area receives a drive signal of an image frame and when a liquid crystal in the lowermost display area completely responds, and each of the backlight units being closed when the corresponding display area starts to receive another image frame;

wherein the drive current of the backlight unit corresponding to each display area is used to control luminance of each display area;

wherein the plurality of display areas are a first display area to Nth display area distributed on the liquid crystal display panel from top-down continuously and sequentially; the plurality of backlight units are a first to Nth backlight units corresponding to the N display areas respectively; the luminance of the N display areas are $B_1, B_2, \ldots, B_n$, respectively; the activation durations of the N backlight units are not the same, and are $T_1, T_2, \ldots, T_n$, respectively, where N is an integer equal to or greater than 2; the luminance of each of the N display areas and the activation duration of each of the N backlight units satisfy the following equation:

$$B_1*T_1=B_2*T_2=\ldots=B_n*T_n, \text{ wherein } T_1<T_2<\ldots<T_n;$$

wherein the drive current of each of N backlight units is $I_1, I_2, \ldots, I_n$, respectively, and $I_1>I_2>\ldots, I_n$;

wherein a penetration ratio of current maximum signal of each of display area is $T_{s1}, T_{s2}, \ldots, T_{sn}$, respectively; after compensating the penetration ratio of the current maximum signal of each of display area to $T_{s255}$ in the N display areas, where $T_{s255}$ is a penetration ratio of greyscale 255, the luminance of each of N display areas is $B_{11}, B_{21}, \ldots, B_{n1}$, respectively; and the luminance of each of N display areas after adjustment satisfies the following equation:

$$T_1*B_1*T_{s1}=T_1*B_{11}*T_{s255}, T_2*B_2*T_{s2}=T_2*B_{21}*T_{s255}, \ldots, T_n*B_n*T_{sn}=T_n*B_{n1}*T_{s255}, \text{ wherein } T_{s1}<T_{s255}, T_{s2}<T_{s255}, \ldots, T_{sn} \leq T_{s255}.$$

4. The method as claimed in claim 3, wherein after adjusting the N display areas, the drive current of each of the N display areas is $I_{11}, I_{21}, \ldots, I_{n1}$, respectively, and $I_{11}<I_1, I_{21}<I_2, \ldots, I_{n1}<I_n$.

* * * * *